April 12, 1927.
V. U. D. PIERCE
1,624,432
INTERNAL COMBUSTION ENGINE
Filed Oct. 10, 1923
2 Sheets-Sheet 1
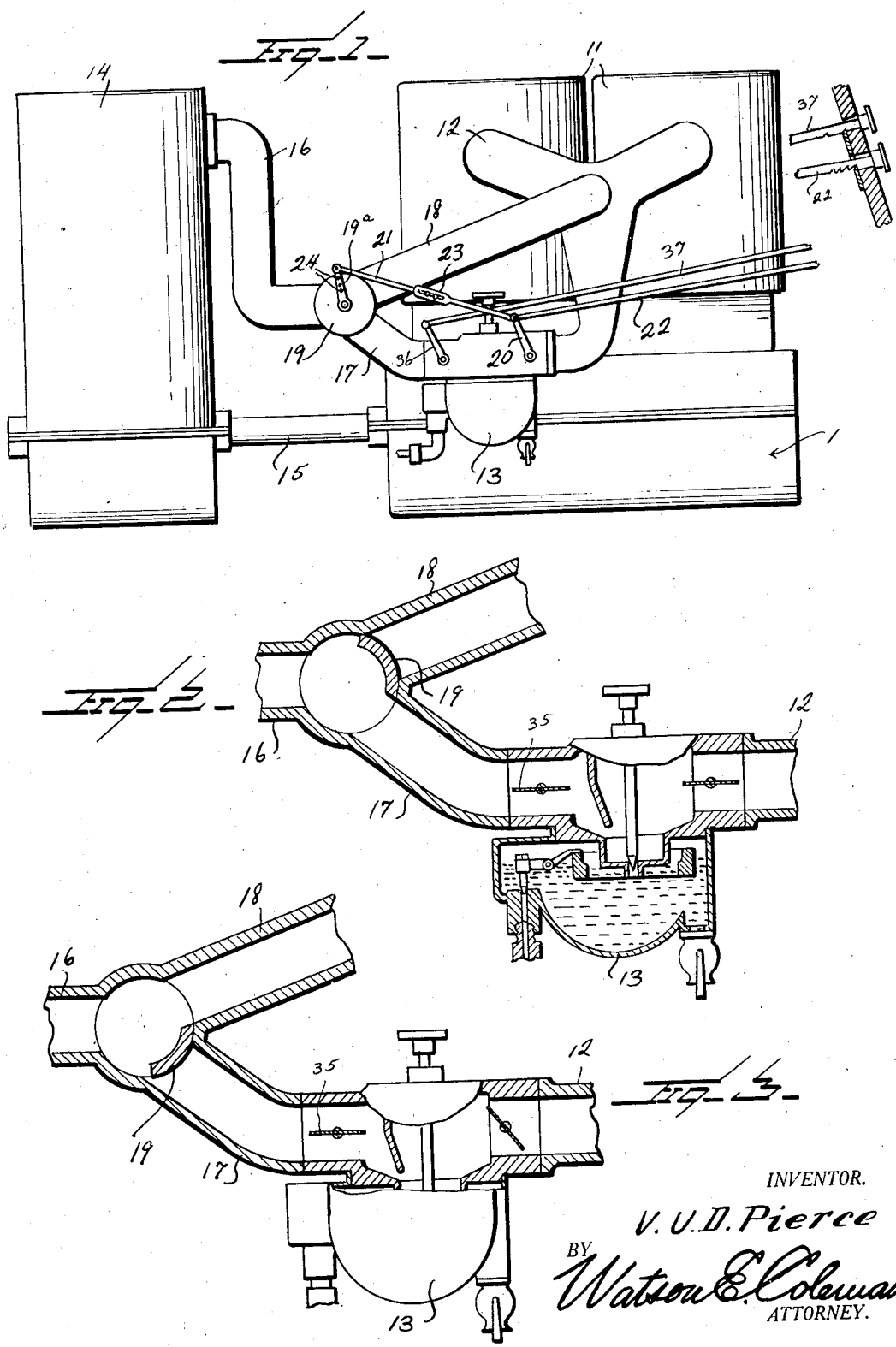
INVENTOR.
V. U. D. Pierce
BY Watson E. Coleman
ATTORNEY.

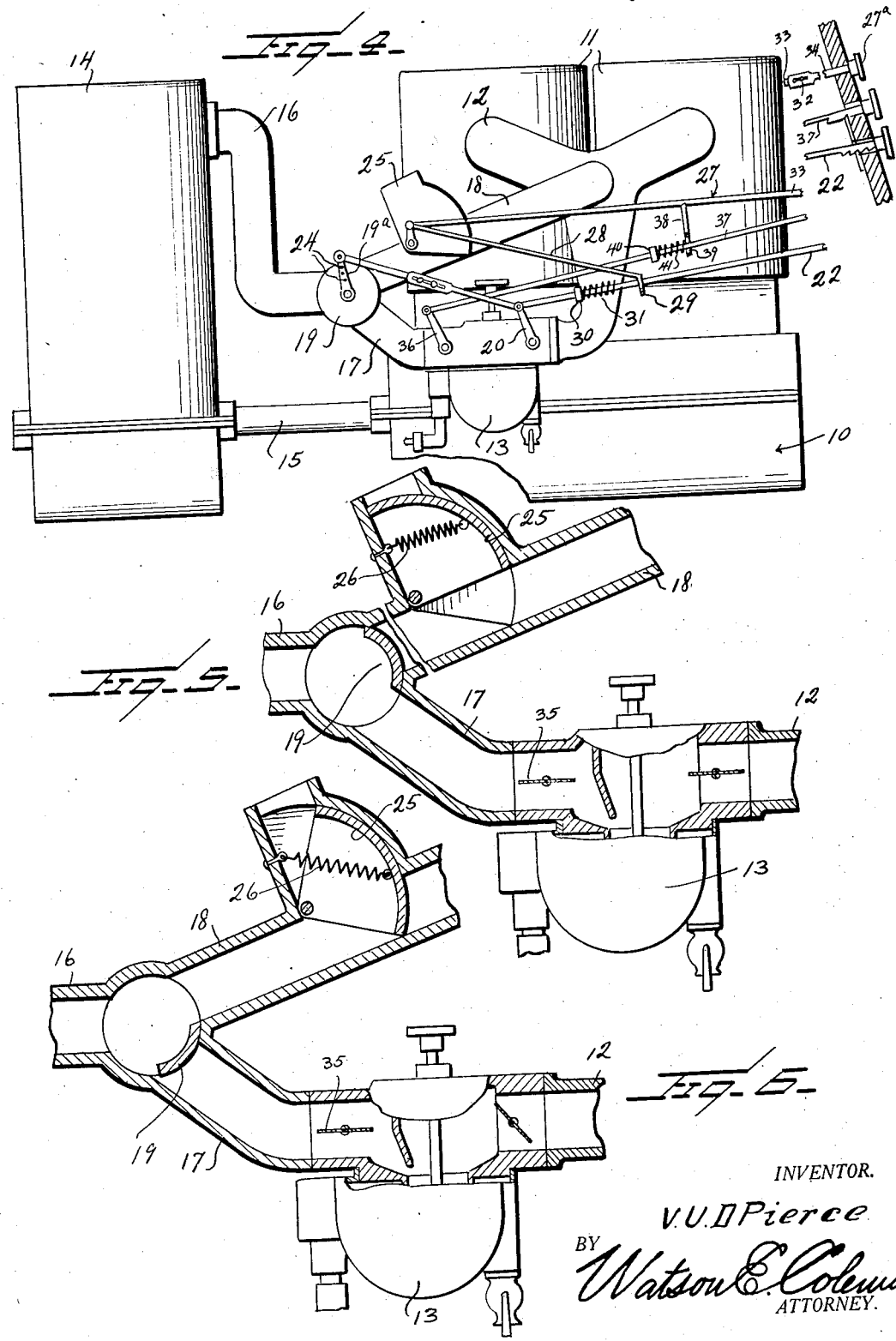

Patented Apr. 12, 1927.

1,624,432

UNITED STATES PATENT OFFICE.

VINTON U. D. PIERCE, OF ASHEVILLE, NORTH CAROLINA; JOSIAH PIERCE EXECUTOR OF SAID VINTON U. D. PIERCE, DECEASED.

INTERNAL-COMBUSTION ENGINE.

Application filed October 10, 1923. Serial No. 667,768.

This invention relates to internal combustion engines and more particularly to a charge forming device therefor.

An important object of the invention is to provide means for delivering to cylinders of an engine at each revolution thereof a constant amount of air, the proportion of the combustible to the air being varied to suit the needs of operation.

A further object of the invention is to provide in a device of this character a combined control for the carburetor and air delivery determining the amount of the air which is introduced to the cylinder and which passes through the carburetor.

A further and more specific object of the invention is to provide in combination with an internal combustion engine, a pump having a minimum capacity equal to the cubical contents displaced on the suction stroke of the engine at each revolution of the engine, together with connections to the engine cylinders such that a portion of this charge is delivered through the carburetor and the remainder of the charge directly to the cylinders.

A further object of the invention is to provide in a device of this character and in combination with such a pump and air feeding apparatus, a valve for controlling the amount of air which is directed into the cylinders and around the carburetor and a connection between this valve and the throttle valve of the carburetor whereby during adjustment of the carburetor throttle valve this valve is shifted to vary the amount of air which is by-passed around the carburetor.

A further object of the invention is to provide in combination with apparatus of this character, means whereby that portion of the charge passing directly to the cylinder may be diverted and discharged to the air, if so desired, thus enabling the engine to operate in its usual manner.

A still further object of the invention is to provide means for automatically operating this cut-off so that when the throttle is positioned for idling speeds the cut-off is thrown into operation and the only air entering the engine passes through the carburetor.

These and other objects I attain by the construction shown in the accompanying drawings, wherein for the purpose of illustration is shown a preferred embodiment of my invention and wherein:—

Figure 1 is a side elevation showing an internal combustion engine equipped with charge forming apparatus in accordance with my invention;

Figure 2 is a sectional view showing the realtive position of the carburetor throttle and air feed control valve when the throttle is open;

Figure 3 is a similar view illustrating the positions of the valves with the throttle substantially closed;

Figure 4 is a view similar to that shown in Figure 1 and illustrating a modified arrangement of the charge forming apparatus; and Figures 5 and 6 are views similar to Figures 2 and 3 illustrating the position of the valve when the throttle is open and nearly closed.

Referring now more particularly to the drawings, the numeral 10 indicates an engine, in the present instance shown as including four cylinders 11 in communication through an intake manifold 12 with a carburetor 13. The numeral 14 designates a pump which may be of any suitable character but which must be of a capacity such that it discharges at each rotation of the engine an amount of air equal to the cubical content displaced by the engine at each rotation. In the present instance this pump is shown as directly connected to the engine shaft 15 to be operated thereby and accordingly will make one operation at each rotation of the engine. The engine 10 being four cycle the displacement at each rotation thereof will be equal to the content of one cylinder and if, for example, this cylinder has a displacement of fifty cubic inches, the amount of air displaced by the pump at each operation must be at least fifty cubic inches and preferably slightly more than this.

The discharge conduit 16 of the pump is branched to form two separate conduits 17 and 18, one of which communicates directly with the intake manifold 12 and the other of which communicates with the intake of the carburetor 13. At the junction of the branches 17 and 18 with the main conduit 16 a valve 19 is disposed so constructed that upon operation thereof the amount of air from the conduit 16 which passes through the branches 17 and 18 is altered as to the proportion of these amounts. The valve is such, however, that the combined delivery through the valve to the conduits 17 and 18 is at all times equal to the amount of discharge of the pump. This valve, accordingly, may be operated to determine the amount of air which is respectively delivered to the carburetor and to the intake manifold. That air which passes through the carburetor will, of course, be intermingled with the fuel supplied to the carburetor and will represent the combustible portion of the charge. That air entering through the branch 18 may be termed the filling portion of the charge.

It is preferred that the valve 19 through its operating arm 19ª be connected to the throttle operating arm 20 of the carburetor. In the present instance I have shown a link 21 as connecting these arms and accordingly upon movement of the operating rod 22 of the carburetor throttle the valve 19 will likewise be shifted. In setting the valve 19 the valve is, of course, positioned so that the most efficient operation of the engine is obtained. This is obtained in practically all instances by setting the valve so that when the carburetor throttle is nearly closed the amount of air passing through the conduit 17 is reduced to a minimum, the valve 19 merely closing communication between the conduit 16 and branch conduit 17 and delivering to the branch conduit 18 the maximum amount of air. As the throttle is opened the valve 19 is shifted so that the amount of air delivered to the conduit 18 is decreased and that delivered to the conduit 17 is increased.

Since in the operation of different engines of the same make different adjustments of the valve 19 will be necessary, depending upon the condition of the pistons and cylinders of the engine and upon the quality of fuel employed in the carburetor 13, the link connection 21 between the carburetor throttle arm 20 and the arm 19ª of the valve 19 is made adjustable as to length, as at 23, so that this setting may be varied. Since further the length of movement of the throttle arms of various types of carburetors as applied to the same type of engine is different, the arm 19ª is preferably so constructed that the point of connection of the link 21 is adjustable longitudinally thereof, as indicated by the spaced openings 24, for the reception of this end of the arm.

An engine provided with a charge forming apparatus of this character is more quickly responsive to the throttle and very economical in fuel consumption, the delivered volume to the cylinders, however, being constant and the compression of the entire charge being uniform regardless of the proportion or value of the charge. It will, therefore, be readily understood that a greater horse-power is delivered at low speeds than can ordinarily be attained, resulting in a smoother operation of the engine and a lessening of the strain placed thereon when operated at such low speeds.

It will be obvious that the charge being uniform in compression, that the speed of rotation of the engine will be greater for such low speeds than with the ordinary type of engine. In fact, in some instances the speed of the engine with the throttle nearly closed is too great for an economical idling speed. I, accordingly, provide in combination with this form of charge forming mechanism a valve 25 disposed in the branch conduit 18, which valve may be positioned to close the conduit 18 and to place that portion of the conduit between the valve 19 and the valve 25 in communication with the air so that air passing through the valve 19 will be exhausted to the air and the only air entering the engine will pass through the carburetor 18. It will be obvious that during periods when this valve is positioned to close the conduit 18, the engine will operate in the usual manner. This valve may also be positioned to close communication with the air and reopen the conduit 18 and is normally held in the last named position by a spring 26. The valve which is of the quick opening type has connected to the arm thereof a manually controlled operating element 27 and has further connected to the operating arm thereof a link 28, the free end of which has a loop 29 engaging about the throttle control rod 22. The throttle control rod is provided with a stop collar 30 opposing the loop 29 and between this collar and the loop a spring 31 surrounds the throttle rod 22. This spring is of sufficient strength to shift the link 28 and accordingly the valve 25 against the action of the spring 26 but will yield after the valve 25 is fully shifted to permit further movement of the throttle rod and throttle. The spring is so arranged that when the throttle is arriving at the closed position it comes into contact with the loop 29, shifting the link 28 and valve 25 to close the branch conduit 18 so that air entering this conduit from the valve 19 passes to the atmosphere. It will be noted that automatic and mechanical means are provided for the operation of the valve 25 thus permitting the valve to be operated automatically at idling speeds to thereby insure that such idling speed is sufficiently low or may be manually operated at high speeds to enable use of the engine in a normal manner whenever this may be necessary or desirable.

The manually controlled operating element 27 is so constructed, for example as illustrated at 32, that it permits movement of the valve without movement of the operating end 27ᵃ. This construction may take any desired form, in the present instance being illustrated as accomplished by forming the operating rod 27 in two sections 33 and 34 having a pin and slot connection at 32. This pin and slot connection is preferably adjacent the operating end of the rod for a purpose presently to appear.

It will be obvious that during starting of the engine when cold, the admission of air from the pump directly to the intake manifold will be undesirable. At this time it is particularly desirable that the charge admitted to the cylinders be very rich in the combustible fuel employed in the carburetor and to this end the choke valve 35 of the carburetor is usually operated, being provided with a manually controlled operating arm 36 for this purpose, the arm being controlled through a rod 37 leading to the dash of the vehicle. In order that the rod 37 during its operation may close the valve 25, I provide the operating rod 27 upon that section thereof which is directly connected to the arm of the valve 25 with a rigid arm 38 having a slot 39 through which the rod 37 is directed. The rod 37 is provided intermediate the arm 38 of the rod 27 and the operating arm 36 of the choke valve with a stop collar 40 for engaging and operating this arm. Since the valve 25 is of the quick opening type and has but a short travel it will be necessary to compensate for the difference in travel of the arm of the valve 25 and the arm of the valve 35 and accordingly a spring 41 is disposed intermediate the arm 38 and stop collar 40 about the operating rod 37 to compensate for the extra movement of the operating arm 36. It will thus be seen that as the choke valve is operated and during the initial operation thereof, the valve 25 will be shifted to close the branch conduit 18 and by-pass air from the pump directly to the atmosphere so that the charge entering the engine after a predetermined closure of the choke valve is drawn directly from the carburetor and enriched in the usual manner.

It will, of course, be obvious that many changes are possible in the construction as hereinbefore described. The valves 18 and 25 are capable of a wide range of modification and the pump described may be of any suitable type and may, if so desired, have an output sufficient to insure delivery of a partially compressed charge to the engine to thereby increase the compression of the engine. Other changes being possible in the construction as hereinbefore set forth without in any manner departing from the spirit of my invention I do not limit myself to such specific structure except as hereinafter claimed.

I claim:—

1. In combination with an internal combustion engine embodying the usual intake manifold and carburetor, a pump delivering to the engine cylinders at each cycle of the engine through said manifold and through said carburetor an amount of air equal to the piston displacement of the engine during such cycle, including a discharge branched to form two conduits, one communicating with the intake manifold and the other with the intake of the carburetor, and a valve in the first named conduit operable to open the conduit to permit passage of air therethrough or to by-pass air to the atmosphere and to close said conduit.

2. In combination with an internal combustion engine embodying the usual intake manifold and carburetor, a pump delivering to the engine cylinders at each cycle of the engine through said manifold and through said carburetor an amount of air equal to the piston displacement of the engine during such cycle, including a discharge branched to form two conduits, one communicating with the intake manifold and the other with the intake of the carburetor, means for determining the amount of air delivered to the engine through each of said conduits, and a valve in the first named conduit operable to open the conduit to permit passage of air therethrough to the engine or to by-pass air from the pump to the atmosphere and to close said conduit.

3. In combination with an internal combustion engine embodying the usual intake manifold and carburetor, a pump delivering to the engine cylinders at each cycle of the engine through said manifold and through said carburetor an amount of air equal to the piston displacement of the engine during such cycle, including a discharge branched to form two conduits, one communicating with the intake manifold and the other with the intake of the carburetor, means for determining the amount of air delivered to the engine through each of said conduits, a valve in the first named conduit operable to open the conduit to permit passage of air therethrough to the engine or to by-pass air from the pump to the atmosphere and to close said conduit, and means for automatically shifting said valve to the last named position when the throttle reaches a predetermined position.

4. In combination with an internal combustion engine embodying the usual intake manifold and carburetor, a pump delivering to the engine cylinders at each cycle of the engine through said manifold and through said carburetor an amount of air equal to the piston displacement of the engine during such cycle, including a discharge branched to form two conduits, one communicating with the intake manifold and the other with the intake of the carburetor, means for determining the amount of air delivered to the engine through each of said conduits, a valve in the first named conduit operable to open the conduit to permit passage of air therethrough to the engine or to by-pass air from the pump to the atmosphere and to close said conduit, means for automatically shifting said valve to the last named position when the throttle reaches a predetermined position, and manually operated means for shifting said valve.

5. In combination with an internal combustion engine embodying the usual intake manifold and carburetor, a pump delivering to the engine cylinders at each cycle of the engine either through said manifold or through said carburetor or partly through each an amount of air equal to the piston displacement of the engine during such cycle, including a discharge branched to form two conduits, one communicating with the intake manifold and the other with the intake of the carburetor, a single valve positioned at the branch of the discharge controlling said conduits to determine the amount of air passing through each thereof, and a connection between said valve and the throttle valve of the carburetor.

6. In combination with an internal combustion engine embodying the usual intake manifold and carburetor, a pump delivering to the engine cylinders at each cycle of the engine either through said manifold or through said carburetor or partly through each an amount of air equal to the piston displacement of the engine during such cycle, including a discharge branched to form two conduits, one communicating with the intake manifold and the other with the intake of the carburetor, a single valve positioned at the branch of the discharge controlling said conduits to determine the amount of air passing through each thereof, and a connection between said valve and the throttle valve of the carburetor shifting the valve to increase the amount of air delivered to the first named conduit and decrease the air delivered to the second named conduit as the throttle valve is closed.

7. In combination with an internal combustion engine embodying the usual intake manifold and carburetor, a pump delivering to the engine cylinders at each cycle of the engine through said manifold and through said carburetor an amount of air equal to the piston displacement of the engine during such cycle, including a discharge branched to form two conduits, one communicating with the intake manifold and the other with the intake of the carburetor, a valve positioned at the branch of the discharge controlling said conduits to determine the amount of air passing through each thereof, a connection between said valve and the throttle valve of the carburetor shifting the valve to increase the amount of air delivered to the first named conduit and decrease the air delivered to the second named conduit as the throttle valve is closed, and a valve in the first named conduit operable to open the conduit to permit passage of air from the pump to the intake manifold or to by-pass air to the atmosphere and to close said conduit.

8. In combination with an internal combustion engine embodying the usual intake manifold and carburetor, a pump delivering to the engine cylinders at each cycle of the engine through said manifold and through said carburetor an amount of air equal to the piston displacement of the engine during such cycle, including a discharge branched to form two conduits, one communicating with the intake manifold and the other with the intake of the carburetor, a valve positioned at the branch of the discharge controlling said conduits to determine the amount of air passing through each thereof, a connection between said valve and the throttle valve of the carburetor shifting the valve to increase the amount of air delivered to the first named conduit and decrease the air delivered to the second named conduit as the throttle valve is closed, a valve in the first named conduit operable to open the conduit to permit passage of air from the pump to the intake manifold or to by-pass air to the atmosphere and to close said conduit, and means for automatically shifting said valve to the last named position when the throttle valve is nearly closed.

9. In combination with an internal combustion engine embodying the usual intake manifold and carburetor, a pump delivering to the engine cylinders at each cycle of the engine through said manifold and through said carburetor an amount of air equal to the piston displacement of the engine during such cycle, including a discharge branched to form two conduits, one communicating with the intake manifold and the other with the intake of the carburetor, a valve positioned at the branch of the discharge controlling said conduits to determine the amount of air passing through each thereof, a connection between said valve and the throttle valve of the carburetor shifting the valve to increase the amount of air delivered to the first named conduit and decrease the air delivered to the second named conduit as the throttle valve is closed, a valve in the first named conduit operable to open the conduit to permit passage of air from the pump to the intake manifold or to by-pass air to the atmosphere and to close said conduit, means for automatically shifting said valve to the last named position when the throttle valve is nearly closed, and manual means for operating the last named valve.

10. In combination with an internal combustion engine embodying the usual intake manifold, carburetor and throttle and choke valves for the carburetor, a pump delivering to the engine cylinders at each cycle of the engine through said manifold and carburetor an amount of air equal to the piston displacement of the engine during such cycle, including a discharge branched to form two conduits, one communicating with the intake manifold and the other with the intake of the carburetor, a valve in the first named conduit operable to open the conduit to permit passage of air therethrough to the intake manifold or to by-pass air to the atmosphere and close the conduit, and a connection between said valve and the choke valve of the carburetor shifting said valve to the last named position upon operation of the choke valve to close the same.

11. In combination with an internal combustion engine embodying the usual intake manifold, carburetor and throttle and choke valves for the carburetor, a pump delivering to the engine cylinders at each cycle of the engine through said manifold and carburetor an amount of air equal to the piston displacement of the engine during such cycle, including a discharge branched to form two conduits, one communicating with the intake manifold and the other with the intake of the carburetor, a valve in the first named conduit operable to open the conduit to permit passage of air therethrough to the intake manifold or to by-pass air to the atmosphere and close the conduit, a connection between said valve and the choke valve of the carburetor shifting said valve to the last named position upon operation of the choke valve to close the same, and means operated by the throttle valve for determining the amount of air from said pump passing through the branches of the discharge.

12. In combination with an internal combustion engine embodying the usual intake manifold, carburetor and throttle and choke valves for the carburetor, a pump delivering to the engine cylinders at each cycle of the engine through said manifold and carburetor an amount of air equal to the piston displacement of the engine during such cycle, including a discharge branched to form two conduits, one communicating with the intake manifold and the other with the intake of the carburetor, a valve in the first named conduit operable to open the conduit to permit passage of air therethrough to the intake manifold or to by-pass air to the atmosphere and close the conduit, a connection between said valve and the choke valve of the carburetor shifting said valve to the last named position upon operation of the choke valve to close the same, an operating rod for the throttle valve, and a connection between said rod and the valve of the first named conduit for closing said valve when the throttle valve is nearly closed.

13. In combination with an internal combustion engine embodying the usual intake manifold, carburetor and throttle and choke valves for the carburetor, a pump delivering to the engine cylinders at each cycle of the engine through said manifold and carburetor an amount of air equal to the piston displacement of the engine during such cycle, including a discharge branched to form two conduits, one communicating with the intake manifold and the other with the intake of the carburetor, a valve in the first named conduit operable to open the conduit to permit passage of air therethrough to the intake manifold or to by-pass air to the atmosphere and close the conduit, a connection between said valve and the choke valve of the carburetor shifting said valve to the last named position upon operation of the choke valve to close the same, a valve at the branch of the discharge controlling the amount of air from said pump directed to said conduits, and a connection between the throttle valve and the last named valve operating the last named valve to increase the amount of air delivered to the carburetor and decrease the amount delivered to the intake manifold as the throttle valve is opened.

In testimony whereof I hereunto affix my signature.

VINTON U. D. PIERCE.